July 6, 1943.　　　J. MOLDAWSKY　　　2,323,667
APPARATUS FOR TENDERING MEAT
Filed Feb. 11, 1941　　　2 Sheets-Sheet 1

Inventor,
J. Moldawsky
By: Glascock Downing & Seebold
Attys.

July 6, 1943.  J. MOLDAWSKY  2,323,667
APPARATUS FOR TENDERING MEAT
Filed Feb. 11, 1941  2 Sheets-Sheet 2
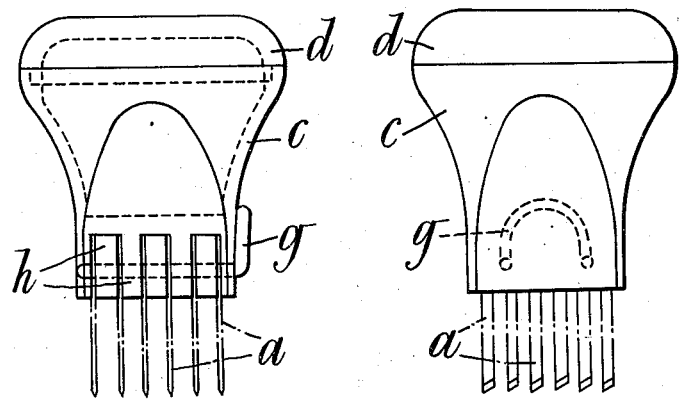
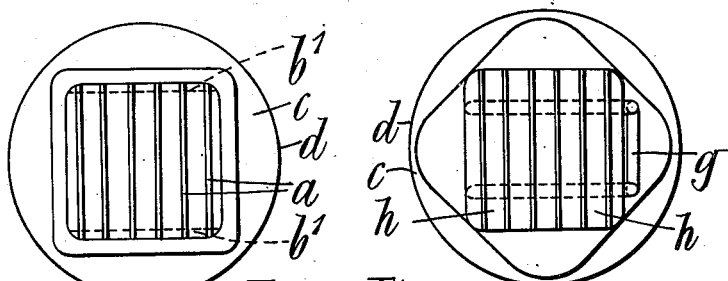
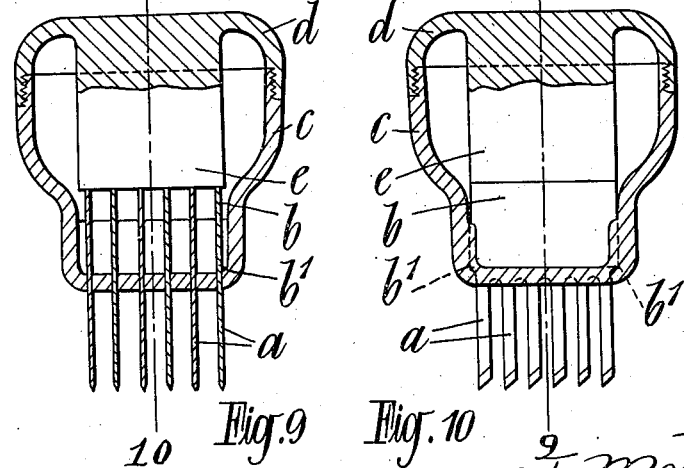

Patented July 6, 1943

2,323,667

UNITED STATES PATENT OFFICE 2,323,667

APPARATUS FOR TENDERING MEAT

Joseph Moldawsky, London, England

Application February 11, 1941, Serial No. 378,421
In Great Britain April 13, 1939

4 Claims. (Cl. 17—30)

This invention relates to apparatus for improving the quality and condition of meat of the kind embodying a hand tool consisting of a knob or handle which may be grasped in the hand, and a plurality of thin blades carried thereby so that they may be directly thrust by hand into the meat to be treated, thereby cutting the sinews and tissues embedded in and between the meat fibres without damaging the meat itself so that the condition of the poorer cuts may be improved and they may be made to approximate to the more expensive cuts both in flavour and cooking qualities.

The invention consists in meat tendering apparatus of the kind referred to in which the handle is hollow and completed by a cap to close the same.

The invention also consists in meat tendering apparatus according to the preceding paragraph in which the blades are of comb-like formation and are shouldered and held in place in the handle by the cap.

Further features of the invention will be apparent from the description given hereafter.

The accompanying drawings illustrate several convenient forms of apparatus in accordance with the invention.

Figure 5 is an underneath plan of a further form of apparatus.

Figure 6 is a front elevation.

Figure 7 is a side elevation, and

Figure 8 is an underneath plan of a further form of this last mentioned form.

Figure 9 is a sectional elevation taken on line 9—9 of Figure 10, and

Figure 10 is a side sectional elevation taken on line 10—10 of Figure 9.

In carrying my invention into effect in one convenient manner I form my improved apparatus with a knob or handle of convenient size and shape such that it may be grasped in one hand.

The knob or handle may be formed from wood, bone, ivory, ebonite, phenolic condensation product, casein product, or other suitable material and it is adapted directly to take a number of thin blades or knives which may be formed in groups such as a series of comb-like blades, it being understood that, however the blades are formed, they are secured to the handle by being inserted in slots or openings in which they may be secured. In a specific example there may be, for example, forty-two blades in the one device, but this number is given purely by way of example and is capable of being varied as may be desired. Each blade may be of plain formation with an inclined or pointed cutting end.

The arrangement is such that the device may be grasped in the hand and directly thrust into the meat to be treated and then easily withdrawn for insertion into another part of the meat so that the whole may be properly and adequately treated.

In the particular construction shown in Figures 1 to 4 the blades $a$ are formed comb-like in groups in plates $b$ which are inserted through slots in the underface of the body $c$ of the handle, the body being hollow and the handle being completed by a cap $d$ screwed or otherwise secured to the body. If desired the cap may have removably secured thereto a weight receiving cup member $e$.

Figure 1:
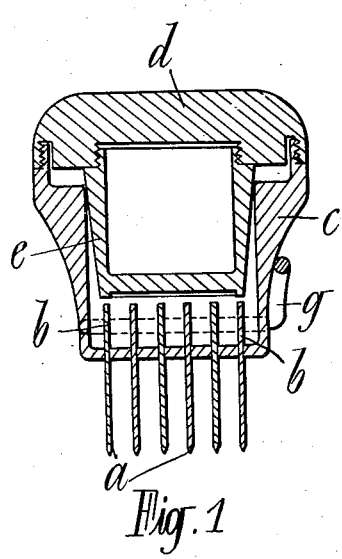
Figure 1 is a sectional elevation of one form of apparatus taken on line 1—1 of Figure 2.
Figure 2:
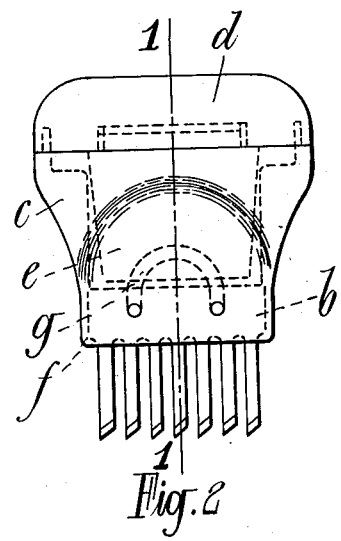
Figure 2 is a side elevation.
Figure 3:
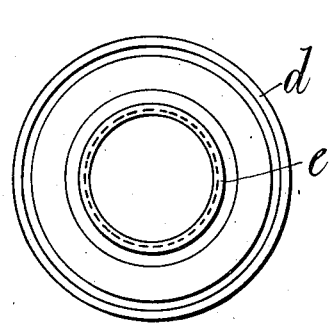
Figure 3 is an underneath plan of Figure 1 with the body and blades removed.
Figure 4:
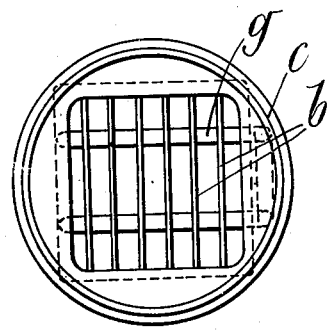
Figure 4 is a plan of Figure 1 with the upper part removed.

The plates $b$ may be inserted in slots in the body as at $f$ and the blades may thus be easily removed for cleaning, being held in place by the U-member $g$. These plates $b$ have shouldered portions which are supported by the lower part of the handle as shown at $b'$. When it is required to clean the device, the member $g$ is removed and, after the cap $d$ has been removed as shown in Figure 4, the blades may be pushed out from the inside.

In the alternative arrangement shown in Figures 5 to 8 the lower face of the handle is recessed and the blades held therein by distance-pieces $h$ between consecutive plates, the whole being secured by U-member $g$ or the like.

In some cases it may be convenient to form the plate portion $b$ of the blades of a somewhat greater width than the overall width of the blades $a$ as shown in Figures 9 and 10 so that the plate portions may engage in slots in the wall of the handle and the shouldered portions will be supported by the lower part of the handle as shown at $b'$. The blades are inserted in position from the inside of the handle and held in place by the cap so that the use of holding screws, rods or U-members may thus be avoided.

I claim:

1. A meat tendering tool comprising a hollow body having parallel slits in its bottom wall which terminates short of the outer edges of the body to leave opposed shoulders, a removable cap for said body, a plurality of comb formed plates removably passing through said slits and having the ends extended and seated on the adjacent opposed shoulders and means situated at least partly within the body for engaging said plates for removably holding said comb formed plates in place with the blades thereof extending outwardly from said slits.

2. A meat tendering tool comprising a hollow body having slits in the base thereof, a removable cap for said body having an integral extension into said body, a plurality of comb formed metal blades having shoulders at the end of the plane portion of the blades and shoulders on the hollow body upon which the first named shoulders may rest when the blades are in operative position.

3. The tool as claimed in claim 2 in which the integral extension of the cap contacts the inner edges of the blades when the tool is assembled.

4. A meat tendering tool comprising a cup-shaped body having a plurality of slits in the wall opposite its open end, a plurality of comb formed blades passing through said slits for a portion of their length only leaving an inner part of each blade abutting against the body and a cap to close said body and having a part holding said blades in firmly abutting relationship with said body when the cap is in completely closed position.

JOSEPH MOLDAWSKY.